US012600229B2

(12) United States Patent
Natarajan et al.

(10) Patent No.: US 12,600,229 B2
(45) Date of Patent: Apr. 14, 2026

(54) POWERTRAIN FOR A WORK MACHINE

(71) Applicant: Mahindra and Mahindra Limited, Tamilnadu (IN)

(72) Inventors: Saravanan Natarajan, Tamilnadu (IN); Sivakumar Arumugham, Tamilnadu (IN); Mohd Ali Abbaas, Tamilnadu (IN); Pavithra Sundaram, Tamilnadu (IN); Arjun Prabhakaran, Tamilnadu (IN); Gokila Ayyasamy, Tamilnadu (IN); Deepak Saini, Tamilnadu (IN)

(73) Assignee: Mahindra and Mahindra Limited, Tamilnadu (IN)

( * ) Notice: Subject to any disclaimer, the term of this patent is extended or adjusted under 35 U.S.C. 154(b) by 0 days.

(21) Appl. No.: 18/281,061

(22) PCT Filed: Mar. 13, 2023

(86) PCT No.: PCT/IB2023/052395
§ 371 (c)(1),
(2) Date: Sep. 8, 2023

(87) PCT Pub. No.: WO2024/134274
PCT Pub. Date: Jun. 27, 2024

(65) Prior Publication Data
US 2025/0313084 A1      Oct. 9, 2025

(30) Foreign Application Priority Data
Dec. 22, 2022    (IN) .............................. 202241074655

(51) Int. Cl.
*B60K 17/28*        (2006.01)
*B60K 25/06*        (2006.01)

(52) U.S. Cl.
CPC .............. *B60K 17/28* (2013.01); *B60K 25/06* (2013.01)

(58) Field of Classification Search
CPC ........... B60K 1/02; B60K 17/28; B60K 25/06
See application file for complete search history.

(56) References Cited

U.S. PATENT DOCUMENTS 6,658,852 B2 *  12/2003  Frey .................... B60L 15/2009
                                                    60/716
6,793,600 B2 *   9/2004  Hiraiwa ................. B60K 6/445
                                                    903/910

(Continued)

FOREIGN PATENT DOCUMENTS

CN          109733175 A  *  5/2019
DE   10 2012 006 731 A1    10/2013

(Continued)

OTHER PUBLICATIONS

International Search Report and Written Opinion for Application No. PCT/IB2023/052395, dated Jun. 14, 2023.

*Primary Examiner* — Laura Freedman
(74) *Attorney, Agent, or Firm* — MARSHALL, GERSTEIN & BORUN LLP

(57) ABSTRACT

The present disclosure relates to a powertrain for a work machine (50). The powertrain (100) comprises a first prime mover (10), a second prime mover (12), a set of first gears (14a, 14b), a set of second gears (16a, 16b), an engaging unit (24), and an actuator (26). The first prime mover (10) configured to engage a first shaft (18). The second prime mover (12) configured to engage a power take off (PTO) shaft (20). The first gears (14a, 14a) mounted on the first shaft (18) and the second gears (16a, 16b) mounted on the PTO shaft (20). The actuator (26) configured to be in communication with the engaging unit (24), and further configured to selectively displace the engaging unit (24) from the idling configuration to the engaging configuration to engage with one of the second gears (16a, 16b). Advantageously, the engaging unit (24) facilitates the coupling of (Continued)

100 the second prime mover (12) with the first prime mover (10); therefore the powertrain (100) provides the desired torque to meet the requirements.

6 Claims, 7 Drawing Sheets

(56) References Cited

U.S. PATENT DOCUMENTS

| | | | | |
|---|---|---|---|---|
| 7,311,627 | B2 * | 12/2007 | Tarasinski | A01B 71/06 |
| | | | | 477/4 |
| 8,469,127 | B2 * | 6/2013 | Tarasinski | B60K 6/26 |
| | | | | 180/65.285 |
| 8,527,131 | B2 * | 9/2013 | Banerjee | B60W 10/10 |
| | | | | 180/65.21 |
| 8,770,327 | B2 * | 7/2014 | Yamada | B60K 6/383 |
| | | | | 180/65.22 |
| 9,097,328 | B2 * | 8/2015 | Erhard | F16H 57/0495 |
| 10,543,843 | B2 * | 1/2020 | Miwa | B60K 35/22 |
| 11,124,058 | B2 * | 9/2021 | Stoltz | B60W 30/1888 |
| 11,655,863 | B1 * | 5/2023 | Versini | B60K 1/02 |
| | | | | 475/5 |
| 11,890,928 | B2 * | 2/2024 | Brolles | B60K 17/165 |
| 2022/0134860 | A1 * | 5/2022 | Dannerbauer | B60K 6/36 |
| | | | | 477/5 |
| 2022/0258582 | A1 * | 8/2022 | Rechenbach | B60K 1/02 |
| 2025/0289304 | A1 * | 9/2025 | Natarajan | B60K 17/28 |

FOREIGN PATENT DOCUMENTS

| | | | |
|---|---|---|---|
| JP | 2001-105910 A | 4/2001 | |
| WO | WO-2024127091 A1 * | 6/2024 | B60K 17/28 |

* cited by examiner

100

POWERTRAIN FOR A WORK MACHINE

FIELD

The present disclosure relates to a powertrain for a work machine and, more particularly, to a multi-motor drive system with a coupling arrangement for power transmission.

Definition

As used in the present disclosure, the following terms are generally intended to have the meaning as set forth below, except to the extent that the context in which they are used indicate otherwise.

IDLING CONFIGURATION: The term 'idling configuration' used in the context of this disclosure refers to a configuration when a gear rotates around a shaft without affecting the movement or rotation of the shaft or without being affected by the rotation of the shaft.

ENGAGING CONFIGURATION: The term 'engaging configuration' used in the context of this disclosure refers to a configuration which the gear engages the PTO shaft to enable the gear to be driven by the PTO shaft.

WHEEL: The term 'wheel' used in the context of this disclosure refers to, the wheel by which the work machine is able to move on the road or OFF road.

BACKGROUND

The background information herein below relates to the present disclosure but is not necessarily prior art.

Generally, work machines, such as agricultural tractors, are used to perform many tasks. To effectively perform the assigned tasks, a work machine requires a power source such as an internal combustion engine (ICE) to propel the work machine.

The ICE driven work machines i.e. agricultural tractors are used to perform functions that require a high output torque and a relatively low maximum ground speed. Further, these work machines are often used in environments that require extra traction as well as used for performing functions that require a high drawbar pull, for example, pushing and pulling heavy loads.

Conventionally, the traction is increased by adding weight on drive wheels or by engaging four wheel drive (4WD) as desired. However, these conventional methods are feasible with IC engines driven work machines for a defined limit of torque, and beyond which the engines fails to supply the required torque.

Further, a traditional electric tractor utilizes a single motor to power the work machine and sustain the harsh conditions such as plowing, harrowing, sowing, transporting, and the like. The power of the single motor is not enough to meet the requirements of multiple working conditions and agricultural operations.

Thus, there is felt a need for a powertrain for work machines which can achieve the desired torque and that alleviates the aforementioned drawbacks.

OBJECTS

Some of the objects of the present disclosure, which at least one embodiment herein satisfies, are as follows:

An object of the present invention is to provide a powertrain for a work machine.

Another object of the present invention is to provide a powertrain which facilitates the coupling of one or more prime movers to meet the desired torque or power requirements.

Still another object of the present invention is to provide a powertrain with compact arrangement of gears and coupler.

Yet another object of the present invention is to provide a powertrain which avoids the overloading and overheating of the prime movers.

Still another object of the present invention is to provide a powertrain which avoids the requirements of oversize prime movers.

Yet another object of the present invention is to provide a powertrain which automatically senses if there is exceed in the power requirements.

Still another object of the present invention is to provide a powertrain which provides smooth and noise free shifting or coupling of gears for additional power transmission.

Yet another object of the present invention is to provide a powertrain which makes the shifting and coupling response quick.

SUMMARY

The present disclosure envisages a powertrain for a work machine. The powertrain comprises a first prime mover, a second prime mover, a set of first gears, a set of second gears, an engaging unit, and an actuator.

The first prime mover is configured to engage a first shaft, and further configured to drive wheels of the work machine. The second prime mover is configured to engage a power take off (PTO) shaft. The set of first gears are fixedly mounted on the first shaft and the set of second gears mounted on the PTO shaft in such a way that at least some of the second gears is in engaged configuration with at least some of the first gears, to thereby transmit power therethrough in an operative configuration of the powertrain.

Further, the engaging unit is mounted on the PTO shaft, and configured to rotate with the rotation of the PTO shaft. The engaging unit is adapted to be selectively orient from an idling configuration to an engaging configuration, and further configured to engage with at least one of the second gears, to thereby transmit additional driving power from the PTO shaft to the first shaft in an operative configuration of the powertrain.

The actuator is configured to be in communication with the engaging unit, and further configured to selectively orient the engaging unit from the idling configuration to the engaging configuration to engage with one of the second gears.

In an embodiment, the powertrain further comprises electronic control unit (ECU) is configured to be in communication with a plurality of sensors and the actuator.

In another embodiment, the plurality of sensors are selected from a group consisting of a draft sensor, a drawbar sensor, a first and a second current sensor, a first and a second speed sensor, and a first and a second direction sensor, for the first and the second prime movers, respectively.

In another embodiment, the engaging unit is defined by a sleeve-hub arrangement. The hub is configured to be rigidly mounted on the first shaft, to enable the sleeve-hub arrangement to rotate with the second shaft.

In another embodiment, the ECU is configured to trigger the actuator to selectively displace or orient the sleeve in an operative backward direction to engage with an operative face of the set of second gear when the first direction sensor senses same direction of rotation of the first prime mover with respect to the direction sensed by the second direction sensor for the second prime mover.

In another embodiment, the ECU is configured to trigger the actuator to selectively displace the sleeve in an operative forward direction to engage with an operative face of the set of second gear when the first direction sensor senses different direction of rotation of the first prime mover with respect to the direction sensed by the second direction sensor for the second prime mover.

In another embodiment, the powertrain includes at least one idler gear to intermediately mesh with one of said set of first gears and one said set of second gears.

In another embodiment, the actuator is selected from a group consisting of a stepper motor, a solenoid actuator, a DC motor and an electromechanical motor or a combination thereof.

In another embodiment, the automotive work machine is an electric tractor or agro-farm machines, configured with said at least two prime movers.

Advantageously, the engaging unit of the powertrain facilitates the coupling of the second prime mover with the first prime movers; therefore, the powertrain provides the desired torque to meet the requirements.

BRIEF DESCRIPTION OF THE ACCOMPANYING DRAWING

A powertrain for a work machine, of the present disclosure will now be described with the help of the accompanying drawing, in which.

LIST OF REFERENCE NUMERALS USED IN DETAILED DESCRIPTION AND DRAWING

Figure 1:
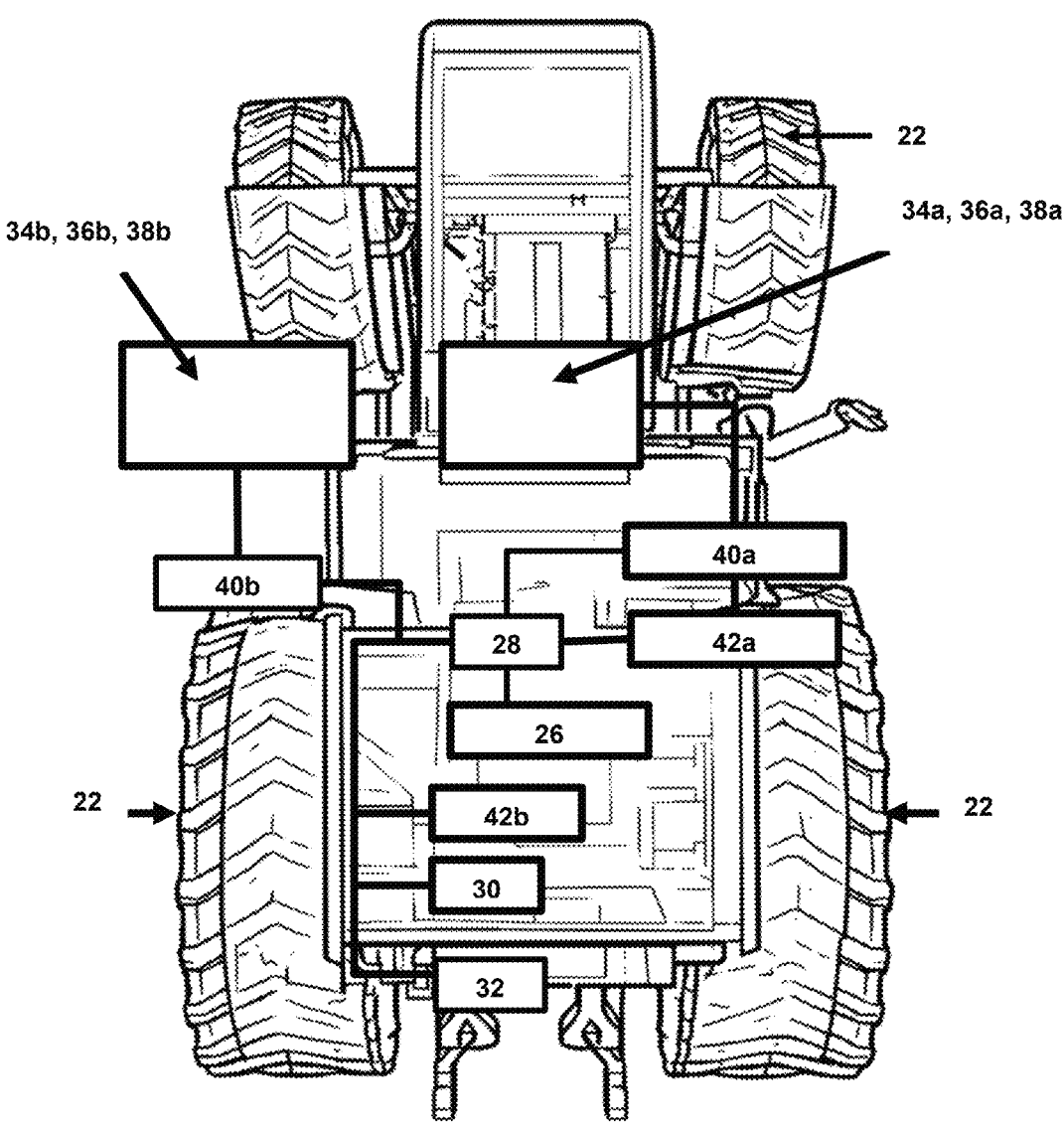
FIG. 1 illustrates an assembly of a plurality of prime movers with a plurality of sensors and control unit in accordance with an embodiment of the present disclosure.

100 Powertrain
50 work machine
10 first prime mover
12 second prime mover
14a, 14b set of first gears
16a, 16b set of second gears
18 first shaft
20 PTO shaft
22 Wheels 24 engaging unit
26 actuator
28 electronic control unit (ECU)
30 draft sensor
32 drawbar sensor
34a first current sensor of first prime mover
34b second current sensor of second prime mover
36a first speed sensor of first prime mover
36b second speed sensor of second prime mover
38a first direction sensor of first prime mover
38b second direction sensor of second prime mover
40a first prime mover controller
40b second prime mover controller
42a mode switch
42b PTO switch
44 idler gear
46a Sleeve
46b Hub
48 Fork
52 elongated member or rod
54 dog teeth
56 Cone
58 circumferential groove

DETAILED DESCRIPTION

Embodiments, of the present disclosure, will now be described with reference to the accompanying drawing.

Embodiments are provided so as to thoroughly and fully convey the scope of the present disclosure to the person skilled in the art. Numerous details are set forth, relating to specific components, and methods, to provide a complete understanding of embodiments of the present disclosure. It will be apparent to the person skilled in the art that the details provided in the embodiments should not be construed to limit the scope of the present disclosure. In some embodiments, well-known processes, well-known grader structures, and well-known techniques are not described in detail.

The terminology used, in the present disclosure, is only for the purpose of explaining a particular embodiment and such terminology shall not be considered to limit the scope of the present disclosure. As used in the present disclosure, the forms "a", "an", and "the" may be intended to include the plural forms as well, unless the context clearly suggests otherwise. The terms "comprises", "comprising", "including", and "having", are open ended transitional phrases and therefore specify the presence of stated features, integers, steps, operations, elements, modules, units and/or components, but do not forbid the presence or addition of one or more other features, integers, steps, operations, elements, components, and/or groups thereof. The particular order of steps disclosed in the method and process of the present disclosure is not to be construed as necessarily requiring their performance as described or illustrated. It is also to be understood that additional or alternative steps may be employed.

When an element is referred to as being "mounted on", "engaged to", "connected to", or "coupled to" another element, it may be directly on, engaged, connected or coupled to the other element. As used herein, the term "and/or" includes any and all combinations of one or more of the associated listed elements.

The terms first, second, third, etc., should not be construed to limit the scope of the present disclosure as the aforementioned terms may be only used to distinguish one element, component, region or section from another component, region, or section. Terms such as first, second, third etc., when used herein do not imply a specific sequence or order unless clearly suggested by the present disclosure.

Terms such as "inner", "outer", "beneath", "below", "lower", "above", "upper", and the like, may be used in the present disclosure to describe relationships between different elements as depicted from the figures.

Typically, ICE driven work machines i.e. agricultural tractors are used to perform functions that require a high output torque and a relatively low maximum ground speed. Further, these work machines are often used in environments that require extra traction as well as used for performing functions that require a high drawbar pull. Conventionally, the traction is increased by adding weight on drive wheels or by engaging four-wheel drive (4WD) as desired. However, these conventional methods are feasible with the IC engines driven work machines for a defined limit of torque, and beyond which the engines fails to supply the required torque beyond the defined limit.

Further, a traditional electric tractor utilizes a single motor to power the work machine and sustain the harsh conditions such as plowing, harrowing, sowing, transporting, and the like. The power of the single motor is not enough to meet the requirements of multiple working conditions and agricultural operations.

In order to address the aforementioned problems, the present disclosure envisages an electric powertrain 100 for a work machine 50 as shown in FIG. 1. According to the present disclosure, the automotive work machine 50 comprises a powertrain 100 which includes a first prime mover 10 and a second prime mover 12. The first prime mover 10 is configured to drive a plurality of wheels 22, whereas the second prime mover 12 is configured to drive rotating agricultural implements, pumps or etc. The first prime mover 10 and the second prime mover 12 are connected to a plurality of sensors 30, 32, 34a, 34b, 36a, 36b, 38a, 38b to monitor in real time the current, the speed and the direction of the prime movers, respectively. The motion of the first prime mover 10 and the second prime mover 12 are being actuated by a mode switch 42a and a PTO switch 42b, and further configured to be controlled by a first prime mover controller 40a and a second prime mover controller 40b, respectively. The FIG. 1 illustrates an assembly of the plurality of prime movers with the plurality of sensors and control unit in accordance with an embodiment of the present disclosure.

In an embodiment, the first prime mover 10 and the second prime mover 12 are electric driven motors or any driving members.

In another embodiment, the PTO switch is selected from a group consisting of an inductive switch, a capacitive switch or a contact type switch.

In another embodiment, the first prime mover 10 and the second prime mover 12 are a traction motor and a PTO motor.

In another embodiment, the plurality of sensors are selected from a group consisting of a draft sensor 30, a drawbar sensor 32, a first and a second current sensor 34a, 34b, a first and a second speed sensor 36a, 36b, and a first and a second direction sensor 38a, 38b, for the first and the second prime movers 10, 12, respectively. The draft sensor 30 is configured to be fitted on a top link to sense the mounting of an implement draft, and the drawbar sensor 32 is configured to be fitted on a drawbar to sense pull from a trailed implement.

In another embodiment, the automotive work machine is an electric tractor or agro-farm machines, configured with the at least two prime movers.

Figure 2:
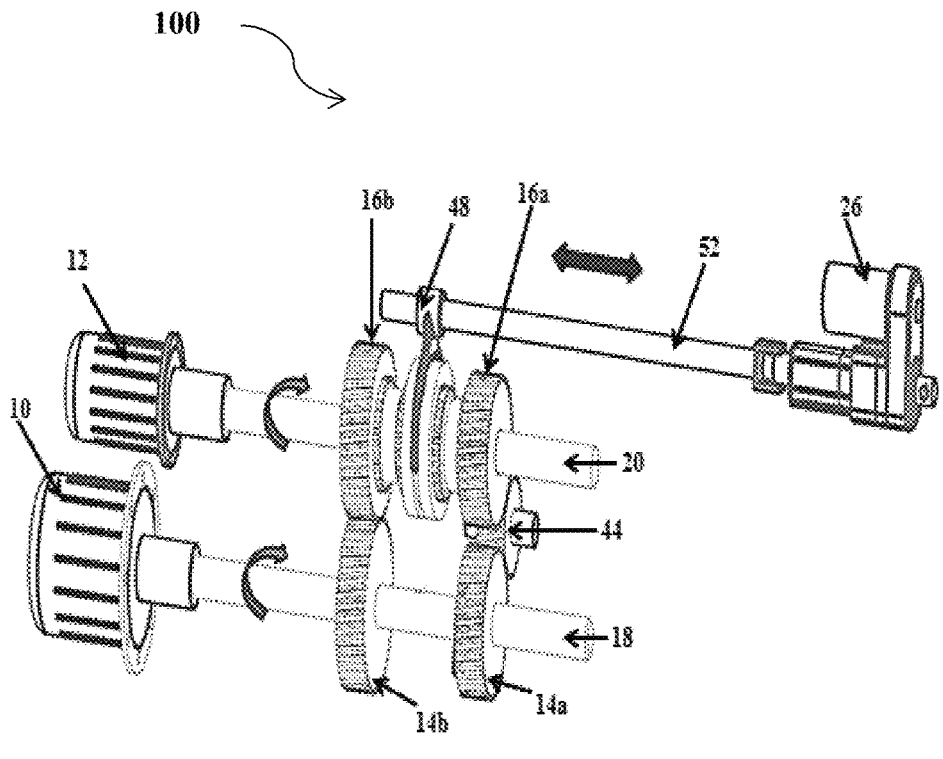
FIG. 2 illustrates an isometric view of a powertrain with a first prime mover, a second prime mover and an actuator in an ideal mode in accordance with an embodiment of the present disclosure.
Figure 3:
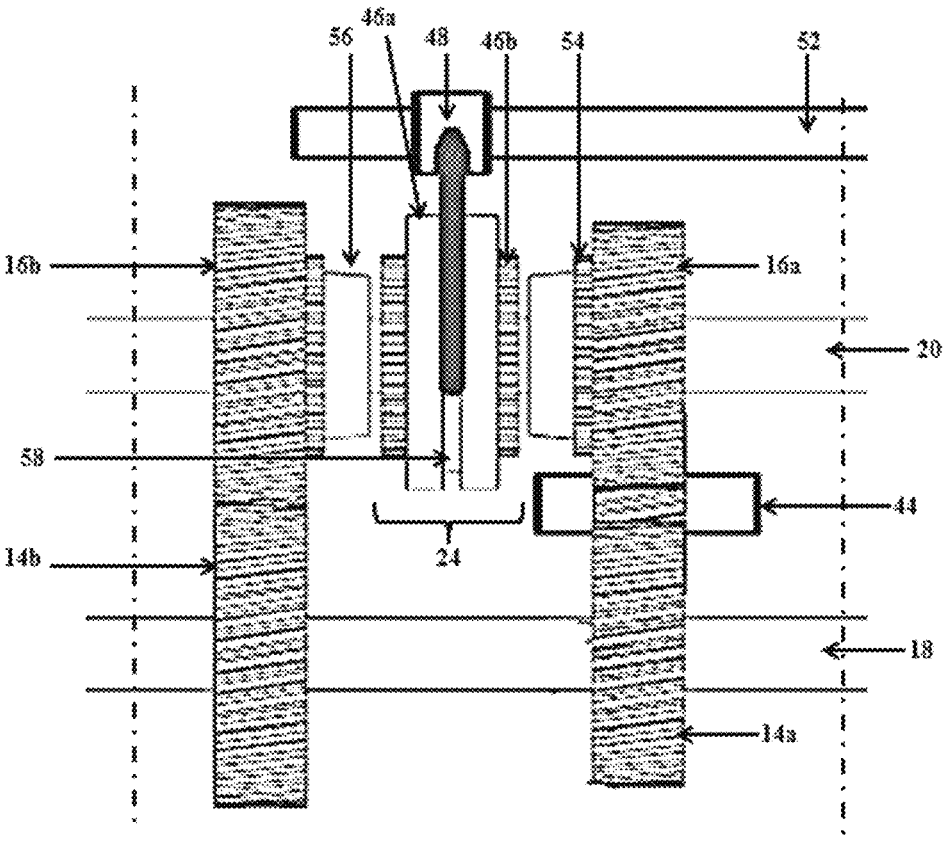
FIG. 3 illustrates a sectional view of gears engagement of a powertrain with a fork configured on an engaging unit in accordance with an embodiment of the present disclosure.

With continued reference to the FIG. 1, an isometric view and a sectional view of the powertrain 100 is shown in FIG. 2 and FIG. 3. The powertrain for the automotive work machine further comprises a first shaft 18, a PTO shaft 20, a set of first gears 14a, 14b and a set of second gears 16a, 16b, an engaging unit 24 and an actuator 26. The first shaft 18 is configured to be engaged with the first prime mover 10, and where the PTO shaft 20 is configured to be engaged with the second prime mover 12. Thus, the driving power from the first prime mover 10 reaches to a differential of the wheels 22 by means of the first shaft 18, and the driving power from the second prime mover 12 reaches to the rotating implements by means of the PTO shaft 20.

Further, the set of first gears 14a, 14b are being fixedly mounted on the first shaft 18, and the set of second gears 16a, 16b are being freely mounted on the PTO shaft 20. Thus, with the rotation of the first shaft 18, the gears 14a, 14b mounted on the first shaft 18 are also rotating with same rotational speed. At least some of the second gears 16a, 16b are being configured to remain in an engaged configuration with at least some of the first gears 14a, 14b, to thereby transmit power therethrough in an operative configuration of the powertrain. An operative face of the set of second gears 16a, 16b is configured with a plurality of dog teeth 54 and a cone 56 thereon. The FIG. 2 illustrates an isometric view of a powertrain with a first prime mover, a second prime mover and an actuator in an ideal mode in accordance with an embodiment of the present disclosure.

In an embodiment, the set of first gears 14a, 14b includes two first gears, rigidly mounted on the first shaft 18, and the set of second gears 16a, 16b, includes two second gears, mounted on the second shaft 20; therefore, the two first gears 14a, 14b are always in engaged configuration with the two second gears 16a, 16b and thus, the second gears 16a, 16b rotates with the rotation of the first gears 14a, 14b.

In an embodiment, the second gears 16a, 16b are freely mounted on the PTO shaft 20 by means of at least one needle bearing. Therefore, the gears 16a, 16b mounted on the PTO shaft 20 are freely rotating while gears 14a, 14b mounted on the first shaft are fixed.

In another embodiment, the powertrain 100 includes at least one idler gear 44 to intermediately mesh with one of set of first gears 14a and one of set of second gears 16a. Therefore, by means of only one idler gear 44, same direction of rotation is achieved between the first gears 14a and the second gears 16a.

Further, the engaging unit 24 are configured to be mounted on the PTO shaft 20. The engaging unit 24 is defined by a sleeve-hub arrangement. An inner surface of the sleeve 46a is configured with a plurality of protrusions and an outer surface of the sleeve is configured with a circumferential groove 58. The hub 46b is configured to be mounted on the PTO shaft 20 in such a way that the hub 46b rotates with the rotation of the PTO shaft 20. The hub 46b is provided with a plurality of grooves on an external surface of the hub. The plurality of internal protrusions of the sleeve 46a slidably meshes with the plurality of external grooves of the hub 46b and thus forms the sleeve-hub arrangement. The circumferential groove 58 of the sleeve is configured to receive and engage a fork 48 therein. The actuator 26 is configured to be in communication with the fork 48 by means of a rod or lever 52, to operative displace or slide the sleeve 46a over the hub 46b. Thus, the actuator 26 selectively displaces the engaging unit 24 or the sleeve hub arrangement between the idling configuration and the engaging configuration of the engaging unit 24 to engage with one of the second gears 16a, 16b. The FIG. 3 illustrates a sectional view of gears engagement of a powertrain with a fork configured on an engaging unit in accordance with an embodiment of the present disclosure.

In an embodiment, the hub 46*b* is configured to be rigidly mounted on the PTO shaft 20, so that the hub 46*b* rotates with the rotation of the PTO shaft 20.

In another embodiment, the PTO shaft 20 is configured with splines to engage the hub thereon. Therefore, the hub rotates with the rotation of the PTO shaft.

In another embodiment, the dog tooth 54 of any one of the second gears 16*a*, 16*b* is configured to receive and engage with the internal protrusion of the sleeve in an operative configuration of the powertrain 100.

In another embodiment, the engaging unit 24 is selected from a group consisting of a synchromesh gear or a clash-mesh gear.

In another embodiment, the actuator 26 is selected from a group consisting of a stepper motor, a solenoid actuator, a DC motor and an electromechanical motor or a combination thereof.

Further, the actuation or the triggering of the actuator 26 is being controlled by the electronic control unit (ECU) 28. The ECU is configured to be in communication with the plurality of sensors. The ECU 28 receives the sensed signal from the plurality of sensors and compares the sensed signal value with a preset value of at least one desired parameter stored in the ECU based on a predetermined set of conditions.

In an embodiment, the desired parameter is selected from a group consisting of torque, speed, current and direction of rotation of the first prime mover and the second prime mover as sensed by the first and the second current sensor, the first and the second speed sensor, and the first and the second direction sensor.

Further, the ECU 28 triggers the actuator in response to the occurrence or satisfaction of the following predetermined set of conditions:

the draft or drawbar sensor 30, 32 value is greater than the preset value for full load for a predefined time and no implement is attached to the PTO shaft 20; and the difference between the torque required for the first shaft 18 with the torque delivered to the first shaft 18 is positive for the predefined time.

Based on the satisfaction of the predetermined set of conditions, the speed of the second prime mover 12 is synchronized with the speed of the first prime mover 10 provided that the current sensed by the second current sensor is less than a predetermined threshold current. The ECU 28 is configured to communicate a response to the actuator 26 to selectively orient the engaging unit 24 from the idling configuration to the engaging configuration, and further configured to engage with at least one of the second gears 16*a*, 16*b* to transmit additional driving power from the second prime mover 12 to the first prime mover 10 in an operative configuration of the powertrain 100 to provide the auxiliary power to the driven wheel.

Figure 4:
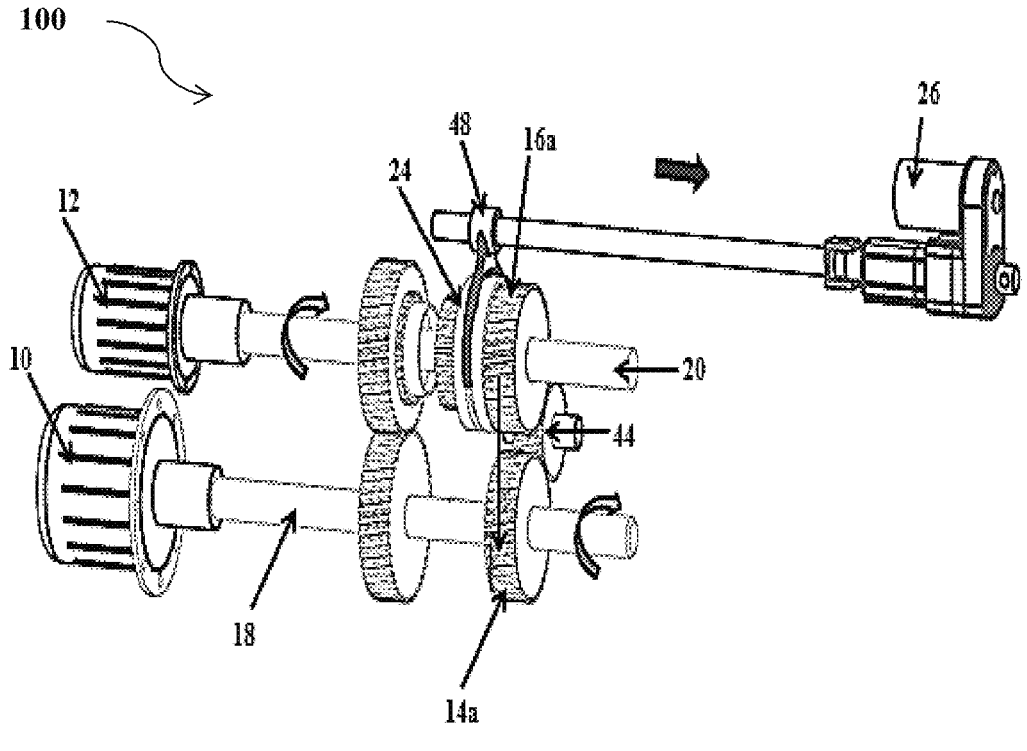
FIG. 4 illustrates an isometric view of the forward sliding of an engaging unit to engage with one of a second set of gears in accordance with an embodiment of the present disclosure.

In an embodiment, the ECU 28 is configured to trigger the actuator 26 to selectively displace the sleeve in an operative backward direction to engage with an operative face of the set of second gear when the first direction sensor senses same direction of rotation of the first prime mover with respect to the direction sensed by the second direction sensor for the second prime mover. FIG. 4 illustrates an isometric view of the backward sliding of an engaging unit to engage with one of a second set of gears in accordance with an embodiment of the present disclosure.

Figure 5:
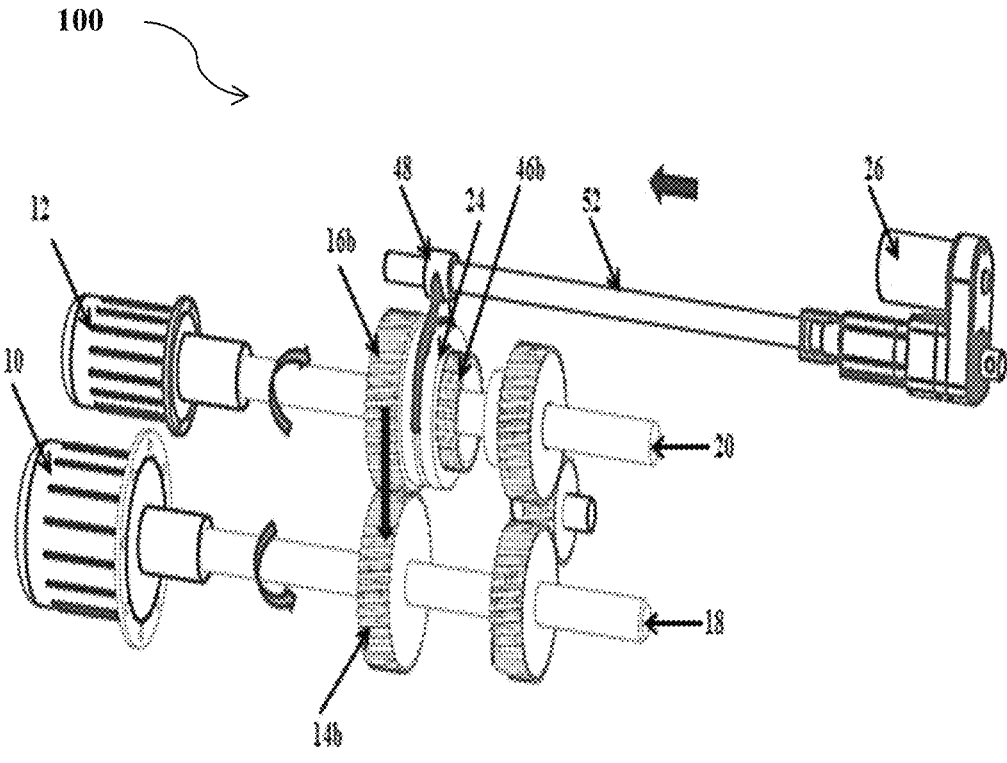
FIG. 5 illustrates an isometric view of the backward sliding of an engaging unit to engage with one of a second set of gears in accordance with an embodiment of the present disclosure; and FIG. 6A

In another embodiment, the ECU is configured to trigger the actuator to selectively displace the sleeve in an operative forward direction to engage with an operative face of the set of second gear when the first direction sensor senses different direction of rotation of the first prime mover with respect to the direction sensed by the second direction sensor for the second prime mover. FIG. 5 illustrates an isometric view of the forward sliding of an engaging unit to engage with one of a second set of gears in accordance with an embodiment of the present disclosure.

Figure 6A:
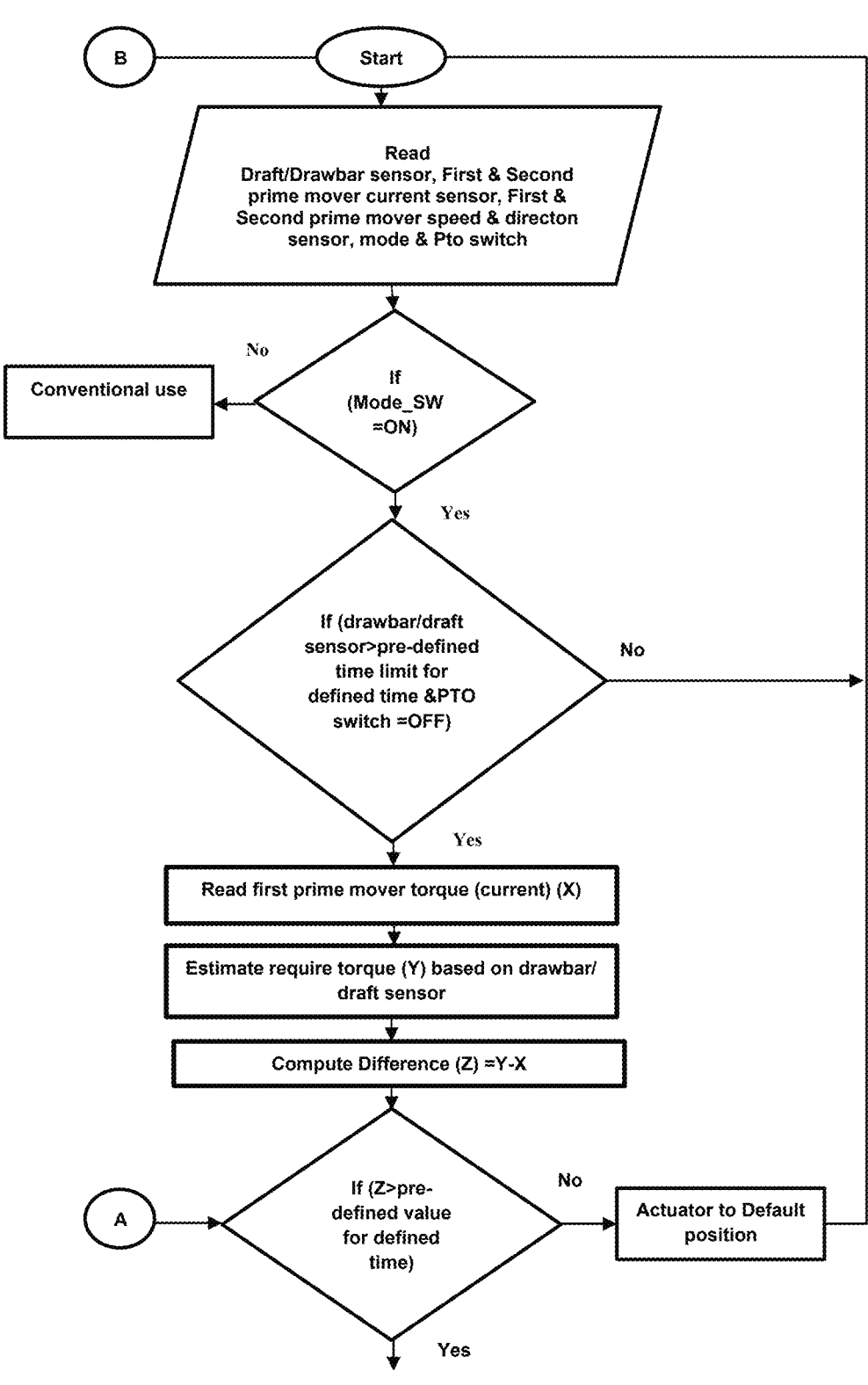
FIG. 6B illustrates a flow chart for a sequence of operation performed by an Electronic Control Unit (ECU) in accordance with an embodiment of the present disclosure.
Figure 6B:
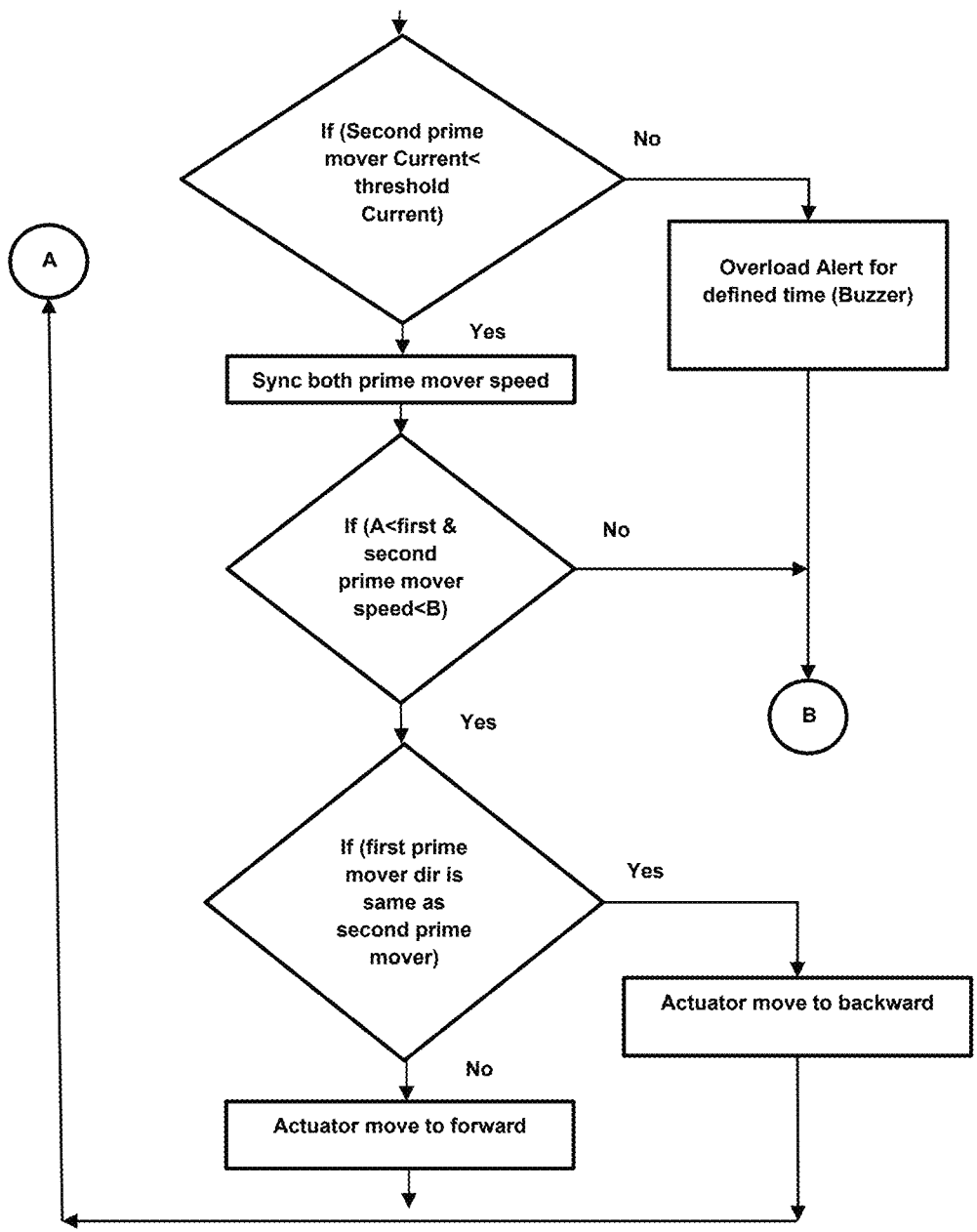

Since the ECU 28 is in communication with the plurality of sensors and the actuator, thus the coupling of the engaging unit with at least one of the second gears is controlled based on the satisfaction of the predetermined set of conditions, therefore the powertrain avoids the overloading and overheating of the prime movers. FIG. 6A and FIG. 6B illustrates a flow chart for a sequence of operation performed by an Electronic Control Unit (ECU) in accordance with an embodiment of the present disclosure.

Advantageously, the engaging unit 24 of the powertrain 100 facilitates the coupling of the second prime mover 12 with the first prime movers 10; therefore, the powertrain 100 provides the desired torque to meet the requirements.

Since, the engaging unit 24 is configured with the PTO shaft 20; therefore, the powertrain provides the compact assembly without any additional requirement of the transmission assembly. Also, it makes the coupling response quick and provides smooth and noise free shifting and coupling of gears.

In an embodiment, the automotive work machine is an electric tractor or agro-farm machines, configured with the at least two prime movers.

The foregoing description of the embodiments has been provided for purposes of illustration and not intended to limit the scope of the present disclosure. Individual components of a particular embodiment are generally not limited to that particular embodiment, but, are interchangeable. Such variations are not to be regarded as a departure from the present disclosure, and all such modifications are considered to be within the scope of the present disclosure.

TECHNICAL ADVANCEMENTS AND ECONOMIC SIGNIFICANCE

The present disclosure described herein above has several technical advantages including, but not limited to, the realization of the powertrain for a work machine, that:

facilitates the coupling of one or more prime movers to meet the desired torque or power requirements;

provides compact arrangement of gears and coupler;

avoids the overloading and overheating of the prime movers;

avoids the requirements of oversize prime movers;

automatically senses and actuate, if there is exceed in the power requirements;

provides smooth and noise free shifting or coupling of gears for additional power transmission; and makes the shifting and coupling response quick.

The embodiments herein and the various features and advantageous details thereof are explained with reference to the non-limiting embodiments in the following description. Descriptions of well-known components and processing techniques are omitted so as to not unnecessarily obscure the embodiments herein.

The foregoing description of the specific embodiments so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The use of the expression "at least" or "at least one" suggests the use of one or more elements or ingredients or quantities, as the use may be in the embodiment of the disclosure to achieve one or more of the desired objects or results.

While considerable emphasis has been placed herein on the components and component parts of the preferred embodiments, it will be appreciated that many embodiments can be made and that many changes can be made in the preferred embodiments without departing from the principles of the disclosure. These and other changes in the preferred embodiment as well as other embodiments of the disclosure will be apparent to those skilled in the art from the disclosure herein, whereby it is to be distinctly understood that the foregoing descriptive matter is to be interpreted merely as illustrative of the disclosure and not as a limitation.

The invention claimed is:

1. A powertrain (100) for a work machine (50), said powertrain (100) comprising:
   a first prime mover (10), configured to engage a first shaft (18), and further configured to drive wheels (22) of the work machine (50);
   a second prime mover (12), configured to engage a power take off (PTO) shaft (20) of the work machine (50);
   a set of first gears (14a, 14b) mounted on said first shaft (18);
   a set of second gears (16a, 16b), mounted on said PTO shaft (20), at least one of said second gears (16a, 16b) engaged with at least one of said first gears (14a, 14b);
   an engaging unit (24), configured to be selectively oriented from an idling configuration to an engaging configuration to engage with at least one of said second gears (16a, 16b) to transmit additional driving power from said PTO shaft (20) to said first shaft (18) for providing auxiliary power to the wheels (22);
   an actuator (26), configured to be in communication with said engaging unit (24), and further configured to selectively orient said engaging unit (24) in an operative configuration of said powertrain (100); and
   an electronic control unit (ECU) (28), configured to be in communication with a plurality of sensors (30, 32, 34a, 34b, 36a, 36b, 38a, 38b) and said actuator (26), the plurality of sensors comprises at least one of a draft sensor (30) or a drawbar sensor (32), said draft sensor (30) configured to be fitted on a top link to sense mounting of an implement draft, said drawbar sensor (32) configured to be fitted on a drawbar to sense pull from a trailed implement, and further including a first and a second current sensor (34a, 34b), a first and a second speed sensor (36a, 36b), and a first and a second direction sensor (38a, 38b) for said first and said second prime movers (10, 12), respectively;
   wherein said ECU (28) is configured to receive a sensed signal value from said plurality of sensors (30, 32, 34a, 34b, 36a, 36b, 38a, 38b) and compare said sensed signal value with a preset value of at least one desired parameter stored in said ECU (28) based on a predetermined set of conditions, and further configured to communicate a response based on the comparison to enable operation of said actuator (26), said at least one desired parameter is selected from a group consisting of torque, speed, current, and direction of rotation of said first prime mover (10) and said second prime mover (12);
   wherein said ECU (28) is configured to trigger said actuator (26) in response to occurrence of the following said predetermined set of conditions:
      a sensed value from at least one of said draft sensor (30) or said drawbar sensor (32) is greater than said preset value for full load for a predefined time and no implement is attached to said PTO shaft (20); and
      a difference between a torque required for said first shaft (18) with a torque delivered to said first shaft (18) is positive for the predefined time.

2. The powertrain (100) as claimed in claim 1, wherein said ECU (28) is configured to receive sensed speed values from the first and second speed sensors (36a, 36b) and to synchronise the speed of said second prime mover (12) with the speed of said first prime mover (10) to enable positive engagement of said engaging unit (24) with one of said set of second gears (16a, 16b), provided that a current sensed by said second current sensor (34b) is less than a predetermined threshold current.

3. The powertrain (100) as claimed in claim 1, wherein said engaging unit (24) is mounted on said PTO shaft (20) and defined by a sleeve (46a)-hub (46b) arrangement, said hub (46b) is configured to be mounted on said PTO shaft (20), to enable said sleeve-hub arrangement to rotate with said PTO shaft (20), an inner surface of said sleeve (46a) is configured with a plurality of protrusions to slidably mesh with a plurality of grooves on an external surface of said hub (46b), an outer surface of said sleeve (46a) is configured with a circumferential groove (58) to receive and engage a fork (48) therein, said fork (48) is configured to engage with said actuator (26), and further configured to slide said sleeve (46a) on said hub (46b) based on triggering of said actuator (26).

4. The powertrain (100) as claimed in claim 3, wherein said ECU (28) is configured to receive sensed direction values from said first and second direction sensors (38a, 38b) and to trigger said actuator (26) to selectively displace said sleeve (46a) in an operative backward direction to engage with an operative face of one of the gears (16a) of said set of second gears (16a, 16b) when said first direction sensor senses (38a) same direction of rotation of said first prime mover (10) with respect to the direction sensed by said second direction sensor (38b) for said second prime mover (12).

5. The powertrain (100) as claimed in claim 3, wherein said ECU (28) is configured to receive sensed direction values from said first and second direction sensors (38a, 38b) and to trigger said actuator (26) to selectively displace said sleeve (46a) in an operative forward direction to engage with an operative face of one of the gears (16b) of said set of second gears (16a, 16b) when said first direction sensor (38a) senses different direction of rotation of said first prime mover (10) with respect to the direction sensed by said second direction sensor (38b) for said second prime mover (12).

6. The powertrain (100) as claimed in claim 5, wherein said operative faces of said set of second gears (16a, 16b) are configured with a plurality of dog teeth (54) and a cone (56) thereon, said plurality of dog teeth (54) are configured to receive and engage with said plurality of protrusions of said sleeve (46*a*) in the operative configuration of said powertrain (100).

\* \* \* \* \*